United States Patent
Liu et al.

(10) Patent No.: US 12,442,109 B2
(45) Date of Patent: Oct. 14, 2025

(54) ANTI-COUNTERFEITING COMPOSITION FOR ANTI-COUNTERFEITING CHEMICAL FIBER AND PREPARATION METHOD AND USE THEREOF

(71) Applicants: NANTONG TEXTILE & SILK IND TECH RES INST, Jiangsu (CN); SOOCHOW UNIVERSITY, Jiangsu (CN)

(72) Inventors: Yuqing Liu, Suzhou (CN); Chuanqi Xu, Suzhou (CN); Zhijuan Pan, Suzhou (CN); Guohe Wang, Suzhou (CN); Lingyun Liu, Suzhou (CN)

(73) Assignees: NANTONG TEXTILE & SILK IND TECH RES INST, Jiangsu (CN); SOOCHOW UNIVERSITY, Jiangsu (CN)

( * ) Notice: Subject to any disclaimer, the term of this patent is extended or adjusted under 35 U.S.C. 154(b) by 0 days.

(21) Appl. No.: 17/311,427

(22) PCT Filed: Jun. 11, 2019

(86) PCT No.: PCT/CN2019/090670
§ 371 (c)(1),
(2) Date: Jun. 7, 2021

(87) PCT Pub. No.: WO2020/248116
PCT Pub. Date: Dec. 17, 2020

(65) Prior Publication Data
US 2022/0090301 A1  Mar. 24, 2022

(51) Int. Cl.
| | | |
|---|---|---|
| *D01F 1/10* | (2006.01) | |
| *D01D 1/02* | (2006.01) | |
| *D01D 5/10* | (2006.01) | |
| *D01F 6/00* | (2006.01) | |

(52) U.S. Cl.
CPC ............... *D01F 1/10* (2013.01); *D01D 1/02* (2013.01); *D01D 5/10* (2013.01); *D01F 6/00* (2013.01)

(58) Field of Classification Search
CPC ..... D01F 1/10; D01F 6/00; D01F 1/02; D01F 1/106; D01F 1/103; D01D 1/02; D01D 5/10; Y10T 442/3976; D06M 11/36; B42D 25/355; B41M 3/14; B41M 3/144; C09D 11/03; C09D 11/50
USPC ........................................................ 428/364
See application file for complete search history.

(56) References Cited

U.S. PATENT DOCUMENTS

| | | | | |
|---|---|---|---|---|
| 2018/0022945 | A1* | 1/2018 | Okada | ...................... C08K 9/04 283/88 |
| 2018/0223454 | A1* | 8/2018 | Martins | ................... C08L 33/08 |

FOREIGN PATENT DOCUMENTS

| | | | |
|---|---|---|---|
| CN | 1252460 | A | 5/2000 |
| CN | 2731620 | Y | 10/2005 |
| CN | 101942707 | B | 2/2012 |
| CN | 102978729 | A | 3/2013 |
| CN | 102998321 | A | 3/2013 |
| CN | 103965618 | A | 8/2014 |
| CN | 103850144 | B | 8/2016 |
| CN | 104963241 | B | 9/2016 |
| CN | 108048932 | A | 5/2018 |
| CN | 108532020 | A | 9/2018 |
| CN | 108796656 | A | 11/2018 |
| EP | 0927749 | A1 * | 2/2003 |
| JP | 2001159096 | A * | 6/2001 |
| JP | 2016211108 | A * | 12/2016 |

OTHER PUBLICATIONS

International Search Report issued Mar. 9, 2020 for PCT/CN2019/090670.

* cited by examiner

*Primary Examiner* — Jennifer A Boyd
*Assistant Examiner* — Christine X Nisula
(74) *Attorney, Agent, or Firm* — Schmeiser, Olsen & Watts LLP

(57) ABSTRACT

Provided is an anti-counterfeiting composition for anti-counterfeiting fibers, including a carrier, an anti-counterfeiting tracer and a dispersant, wherein the anti-counterfeiting tracer is composed of barium oxide, strontium oxide, aluminum oxide and zinc oxide, and a barium element content, a strontium element content, an aluminum element content, and a zinc element content in the anti-counterfeiting composition is controlled to a fixed feeding mass ratio; in percent by mass, the sum of the barium element content, strontium element content, aluminum element content, and zinc content accounts for 5-50% of the anti-counterfeiting composition; the carrier is a matrix polymer or a bio-derived oil. The anti-counterfeiting composition of the present disclosure can give the anti-counterfeiting fiber advantages of memory tracking properties and identification functions, high anti-counterfeiting capability, and good anti-counterfeiting concealment.

7 Claims, No Drawings

ANTI-COUNTERFEITING COMPOSITION FOR ANTI-COUNTERFEITING CHEMICAL FIBER AND PREPARATION METHOD AND USE THEREOF

CROSS-REFERENCE TO RELATED APPLICATIONS

This application claims priority to PCT Application No. PCT/CN2019/090670, having a filing date of Jun. 11, 2019, the entire contents of which are hereby incorporated by reference.

FIELD OF TECHNOLOGY

The following belongs to the field of chemical fibers with an anti-counterfeiting function, in particular, relates to an anti-counterfeiting composition for anti-counterfeiting chemical fibers and a preparation method and use thereof.

BACKGROUND

Anti-counterfeiting chemical fibers as a common anti-counterfeiting technology have been widely used in securities, banknotes, passports and other fields. At present, anti-counterfeiting chemical fibers are mainly monochromatic fluorescent fibers, and products such as dual-band fluorescent fibers and multi-color dyed fibers, photochromism products, and infrared absorption anti-counterfeiting products have also appeared one after another, such as Chinese patents CN2731620Y, CN103850144B, CN104963241B. With the continuous advancement of science and technology, the anti-counterfeiting features of monochromatic fluorescent fibers and dual-band fluorescent fibers are relatively simple and easy to forge, and the grade of their anti-counterfeiting capability can no longer adapt to high-end security fields such as banknotes and passports; multi-color dyed fibers have poor stability, and are colored fluorescent fibers, which have poor anti-counterfeiting features in concealment and are not suitable for high-end security fields such as banknotes and passports; photochromism products and infrared absorption products are easy to forge, but also susceptible to interference from other substances. At present, CN101942707B provides a method for preparing labeled cellulose fibers, which discloses a dispersion liquid added in the preparation process of cellulose fibers, and the dispersion liquid comprises an inorganic metal compound, a dispersant and water, the dispersant is fatty alcohol polyoxyethylene phosphate, sodium hexametaphosphate, nonylphenol polyoxyethylene ether, sodium polyacrylate or sodium butyl naphthalene sulfonate; the comparison between the retention and addition of the inorganic metal compound in the fibers is used to distinguish and identify textiles; however, on the one hand, it also has the defect of insufficient anti-counterfeiting, which is easy to be imitated and forged and is difficult to obtain memory tracking properties, and on the other hand, the dispersion mentioned is only suitable for use in the preparation of cellulose fibers, which is difficult to apply to the anti-counterfeiting of chemical fibers.

Therefore, the development of chemical fibers with higher anti-counterfeiting safety performance has great practical significance for the anti-counterfeiting in the field of chemical fibers.

SUMMARY

An aspect relates to an anti-counterfeiting composition for anti-counterfeiting fibers with memory tracking properties, identification functions and high anti-counterfeiting capability. The present disclosure also provides a preparation method of the anti-counterfeiting composition mentioned above.

The present disclosure also provides an anti-counterfeiting chemical fiber using the anti-counterfeiting composition mentioned above.

To solve the above technical problems, one technical solution employed by the present disclosure is as follows:

an anti-counterfeiting composition for anti-counterfeiting fibers, comprises a carrier, an anti-counterfeiting tracer and a dispersant, the anti-counterfeiting tracer is composed of barium oxide, strontium oxide, aluminum oxide and zinc oxide, and a barium element content, a strontium element content, an aluminum element content, and a zinc element content in the anti-counterfeiting composition is controlled to a fixed feeding mass ratio; wherein, in percent by mass, the sum of the barium element, the strontium element, the aluminum element, and the zinc element accounts for 5-50% of the anti-counterfeiting composition; the carrier is a matrix polymer or a bio-derived oil.

According to the present disclosure, the "fixed feeding mass ratio" in the "a barium element content, a strontium element content, an aluminum element content, and a zinc element content in the anti-counterfeiting composition is controlled to a fixed feeding mass ratio" can be any ratio, which is just determined before preparation, for example, it can be 1:1:1:1, 1:2:2:5, 1:3:1:5, 1:4:5:5, 1:3:6:10, 1:5:6:8, 2:3:5:5, 1:3:3:3, 2:5:3:5, and so on; furthermore, when the anti-counterfeiting composition having the above ratio is applied to chemical fibers, each chemical fiber can be given a combination sequence for encryption, and if there are enough combination sequences, different chemical fibers can be encoded, and because the four specific metal oxides are contained, when not knowing the specific metal elements, it is not easy to select the most suitable acid to dissolve all the metal elements contained in the chemical fibers, which will cause the measurement results to be inaccurate and difficult to counterfeit; further, when the four metal oxides are present at the same time, the use of conventional single acid for dissolution cannot well dissolve all the metal elements contained in chemical fibers, which will cause inaccurate measurement results and make it more difficult to determine the ratio of the respective element contents, and make it difficult for counterfeiters to counterfeit, which further increases anti-counterfeiting capability and security.

The four specific metal oxides of the present disclosure, namely barium oxide, strontium oxide, aluminum oxide, and zinc oxide have better effects than other elements.

According to some specific aspects of the present disclosure, the matrix polymer is selected from polyethylene glycol terephthalate (PET), polylactic acid (PLA), polycaprolactone (PCL), regenerated PET, polybutylene succinate (PBS), poly (3-hydroxybutyrate-co-3-hydroxyvalerate) (PHBV), poly(butylene adipate-co-terephthalate) (PBAT), polyethylene (PE), polypropylene (PP), polystyrene (PS), polyamide (PA), polyvinyl chloride, polyurethane, and combinations thereof.

According to some preferred aspects of the present disclosure, a flash point of the bio-derived oil is 230-320° C.

According to some preferred aspects of the present disclosure, a density of the bio-derived oil is 0.91-0.95 g/mL.

According to some specific and preferred aspects of the present disclosure, the bio-derived oil is selected from linseed oil, olive oil, grape seed oil, corn oil, castor oil, sesame oil, soybean oil, sunflower seed oil, and combinations thereof. The selection of the above-defined bio-derived oil can make the metal oxides of the present disclosure disperse more uniform, and is suitable for the preparation process of chemical fibers, and has a better effect than other oil carriers.

According to some specific and preferred aspects of the present disclosure, when the carrier is the matrix polymer, the dispersant is polyethylene wax or polypropylene wax or a mixture of both; when the carrier is the bio-derived oil, the dispersant is polyacrylamide or polyethylene glycol with a molecular weight of 400-2000 or a mixture of both.

According to some preferred aspects of the present disclosure, an average particle size of barium oxide, an average particle size of strontium oxide, an average particle size of aluminum oxide, and an average particle size of zinc oxide are respectively 200-750 nm.

According to some preferred aspects of the present disclosure, in percent by mass, when the carrier is the matrix polymer, the sum of the barium element content, strontium element content, aluminum element content, and zinc content accounts for 10-20% of the anti-counterfeiting composition; when the carrier is the bio-derived oil, the sum of the contents of the barium element content, the strontium element content, the aluminum element content, and the zinc element content accounts for 10-40% of the anti-counterfeiting composition.

According to some specific and preferred aspects of the present disclosure, in percent by mass, when the carrier is the matrix polymer, the matrix polymer accounts for 20-70% of the anti-counterfeiting composition; when the carrier is the bio-derived oil, the bio-derived oil accounts for 30-70% of the anti-counterfeiting composition.

According to some specific and preferred aspects of the present disclosure, in percent by mass, the dispersant accounts for 1-8% of the anti-counterfeiting composition.

According to some specific aspects of the present disclosure, in percent by mass, the anti-counterfeiting composition further contains 1-6% antioxidant, 1-6% coupling agent, or combinations thereof, and the antioxidant is antioxidant B215 from CIBA; the coupling agent is KBM403 from Shin-Etsu.

Another technical solution provided by the present disclosure: a preparation method of the above-mentioned anti-counterfeiting composition for anti-counterfeiting chemical fibers, comprising the following steps:

when the carrier is the bio-derived oil:

(a) weighing ingredients of the anti-counterfeiting composition according to formula; (b) after mixing the anti-counterfeiting tracer and dispersant weighed in step (a), adding them to the bio-derived oil, stirring and kneading to obtain an anti-counterfeiting composition;

when the carrier is the matrix polymer:

(i) weighing ingredients of the anti-counterfeiting composition according to formula; (ii) after mixing the ingredients weighed in step (i) evenly, adding them to an extruder for extrusion, with an extrusion temperature of 180-300° C.; (iii) water-cooling, drying, and pelletizing a material strip extruded in step (ii) to obtain an anti-counterfeiting composition.

A further technical solution provided by the present disclosure: an anti-counterfeiting chemical fiber, comprising a fiber-forming polymer and the above-mentioned anti-counterfeiting composition for anti-counterfeiting chemical fibers, and in percent by mass, the sum of the contents of the barium element, the strontium element, the aluminum element, and the zinc element is controlled to 0.1-1% of the anti-counterfeiting chemical fiber.

According to some preferred aspects of the present disclosure, in percent by mass, the sum of the contents of the barium element, the strontium element, the aluminum element, and the zinc element is controlled to 0.5-1% of the anti-counterfeiting chemical fiber.

According to some specific aspects of the present disclosure, the fiber-forming polymer is selected from polyethylene glycol terephthalate (PET), polylactic acid (PLA), polycaprolactone (PCL), regenerated PET, polybutylene succinate (PBS), poly (3-hydroxybutyrate-co-3-hydroxyvalerate) hydroxyvalerate) (PHBV), poly(butylene adipate-co-terephthalate) (PBAT), polyethylene (PE), polypropylene (PP), polystyrene (PS), polyamide (PA), polyvinyl chloride, polyurethane, and combinations thereof.

According to some specific and preferred aspects of the present disclosure, the anti-counterfeiting counterfeiting chemical fiber is prepared by the following method:

when the carrier is a complex of the matrix polymer and the bio-derived oil:

(1-1) preparation of anti-counterfeiting composition: (a) weighing ingredients of the anti-counterfeiting composition according to formula; (b) after mixing the anti-counterfeiting tracer and dispersant weighed in step (a), adding them to the bio-derived oil, stirring and kneading to obtain an anti-counterfeiting composition in liquid form;

(1-2) preparation of anti-counterfeiting chemical fiber: weighing the fiber-forming polymer and the anti-counterfeiting composition prepared in step (1-1) according to formula ratio, and injecting a formula amount of the anti-counterfeiting composition into a melt of the fiber-forming polymer during a mixing stage, melt extruding and spinning to obtain an anti-counterfeiting chemical fiber;

when the carrier is the matrix polymer:

(2-1) preparation of anti-counterfeiting composition: (i) weighing ingredients of the anti-counterfeiting composition according to formula; (ii) after mixing the ingredients weighed in step (i) evenly, adding them to an extruder for extrusion, with an extrusion temperature of 180-300° C.; (iii) water-cooling, drying, and pelletizing a material strip extruded in step (ii) to obtain a granular anti-counterfeiting composition;

(2-2) preparation of anti-counterfeiting chemical fiber: weighing the fiber-forming polymer and the anti-counterfeiting composition prepared in step (2-1) according to formula ratio, mixing, melt extruding and spinning to obtain an anti-counterfeiting chemical fiber.

According to some specific and preferred aspects of the present disclosure, the lighter metal oxide mentioned above are preferentially added to the bio-derived oil, that is, the metal oxide with lower density are preferentially added.

In the present disclosure, the added metal oxides are preferably of high purity to reduce the interference of impurities.

Due to the use of the above technical solutions, the present disclosure has the following advantages over the conventional art:

the specific anti-counterfeiting chemical fiber of the present disclosure uses bio-derived oil as the dispersion system or directly uses the polymer of the chemical fiber as the dispersion system, and four specific metal elements with a fixed feeding ratio are added to form an anti-counterfeiting composition, on the one hand, it can be added in the melt spinning process of anti-counterfeiting chemical fiber in the form of mother liquor or masterbatch, which not only improves the dispersibility, uniformity and compatibility of metal elements in the polymer, but also reduces the processing difficulty and processing cost, avoiding the influence of the added metal elements on the performance of the fiber itself, and at the same time avoiding the problems of difficult dispersion, difficult processing, and unevenness when adding the metal oxides directly in the process of chemical fiber spinning; on the other hand, the anti-counterfeiting composition used in the present disclosure has four specific metal elements with a fixed feeding ratio, which can give chemical fibers a sequence combination that is more difficult to be cracked, and increase the anti-counterfeiting capability, at the same time, the specific metal elements do not damage the performance of the fiber itself, and increases the anti-counterfeiting concealment, so that the anti-counterfeiting chemical fiber of the present disclosure can have advantages of memory tracking properties and identification functions, high anti-counterfeiting capability, and good anti-counterfeiting concealment.

DETAILED DESCRIPTION

In the following, the specific embodiments are combined to further explain the present disclosure in detail; it should be understood that, those embodiments are to explain the basic principle, major features and advantages of the present disclosure, and the present disclosure is not limited by the scope of the following embodiments; the implementation conditions employed by the embodiments may be further adjusted according to particular requirements, and undefined implementation conditions usually are conditions in conventional experiments. In the following, unless otherwise specified, all raw materials are basically commercially available or prepared by conventional methods in the field.

In the following, unless otherwise specified, all raw materials are basically commercially available or prepared by conventional methods in the field. In the following, the average particle sizes of zinc oxide, aluminum oxide, strontium oxide and barium oxide are respectively 350±30 nm, and the purities are all higher than 99.999%; the antioxidants in the following embodiments were antioxidant B215 purchased from CIBA, Swiss, and the coupling agent was KBM403 purchased from Shin-Etsu, Japan.

Embodiment 1: Preparation of an
Anti-Counterfeiting Composition for
Anti-Counterfeiting Chemical Fibers This embodiment provides an anti-counterfeiting composition for anti-counterfeiting chemical fibers, in parts by mass, it contains 59.28 parts of polyethylene glycol terephthalate, 1.24 parts of zinc oxide (1 part of zinc element), and 9.45 parts of aluminum oxide (5 parts of aluminum element), 7.1 parts of strontium oxide (6 parts of strontium element), 8.93parts of barium oxide (8 parts of barium element), 6 parts of polyethylene wax, 4 parts of antioxidant, 4 parts of coupling agent; wherein, content of zinc element:content of aluminum element:content of strontium element:content of barium element=1:5:6:8;

The preparation method was as follows: (1) weighing ingredients of the anti-counterfeiting composition according to formula; using a mill to make the weighed polyethylene terephthalate into powder with an average particle size of 350±30 nm;

(2) mixing the ingredients weighed in step (1) evenly and adding them to a screw extruder for extrusion, with an extrusion temperature of 280±5° C. and a screw speed of 300 r/min;

(3) water-cooling, drying, and pelletizing the material strip extruded in step (2) to obtain a granular anti-counterfeiting composition for anti-counterfeiting chemical fibers.

Embodiment 2: Preparation of an
Anti-Counterfeiting Composition for
Anti-Counterfeiting Chemical Fibers This embodiment provides an anti-counterfeiting composition for anti-counterfeiting chemical fibers, in parts by mass, it contains 64.93 parts of polylactic acid, 2.49 parts of zinc oxide (2 part of zinc element), and 9.45 parts of aluminum oxide (5 parts of aluminum element), 3.55 parts of strontium oxide (3 parts of strontium element), 5.58 parts of barium oxide (5 parts of barium element), 6 parts of polyethylene wax, 4 parts of antioxidant, 4 parts of coupling agent; wherein, content of zinc element:content of aluminum element:content of strontium element:content of barium element=2:5:3:5;

The preparation method was as follows: (1) weighing ingredients of the anti-counterfeiting composition according to formula; using a mill to make the weighed polylactic acid into powder with an average particle size of 350±30 nm;

(2) mixing the ingredients weighed in step (1) evenly and adding them to an extruder for extrusion, with an extrusion temperature of 190±5° C., and a screw speed of 300 r/min;

(3) water-cooling, drying, and pelletizing the material strip extruded in step (2) to obtain a granular anti-counterfeiting composition for anti-counterfeiting chemical fibers.

Embodiment 3: Preparation of an
Anti-Counterfeiting Composition for
Anti-Counterfeiting Chemical Fibers This embodiment provides an anti-counterfeiting composition for anti-counterfeiting chemical fibers, in parts by mass, it contains 63.28 parts of corn oil, 1.24 parts of zinc oxide (1 part of zinc element), and 9.45 parts of aluminum oxide (5 parts of aluminum element), 7.1 parts of strontium oxide (6 parts of strontium element), 8.93 parts of barium oxide (8 parts of barium element), 6 parts of polyethylene glycol 1000, 4 parts of antioxidant; wherein, content of zinc element:content of aluminum element:content of strontium element:content of barium element=1:5:6:8;

The preparation method was:

(1) weighing ingredients in the anti-counterfeiting composition according to formula;

(2) after mixing zinc oxide, aluminum oxide, strontium oxide, barium oxide and polyethylene glycol 1000 weighed in step (1), adding them to corn oil, then adding antioxidants, and kneading in a kneader to obtain a liquid anti-counterfeiting composition for anti-counterfeiting chemical fibers.

Embodiment 4: Preparation of an
Anti-Counterfeiting Composition for
Anti-Counterfeiting Chemical Fibers This embodiment provides an anti-counterfeiting composition for anti-counterfeiting chemical fibers, in parts by mass, it contains 51.09 parts of soybean oil, 3.72 parts of zinc oxide (3 part of zinc element), and 11.34 parts of aluminum oxide (6 parts of aluminum element), 7.11 parts of strontium oxide (6 parts of strontium element), 16.74 parts of barium oxide (15 parts of barium element), 6 parts of polyethylene glycol 400, 4 parts of antioxidant; wherein, content of zinc element:content of aluminum element:content of strontium element:content of barium element=3:6:6:15;

The preparation method was:
(1) weighing ingredients of the anti-counterfeiting composition according to formula;
(2) after mixing zinc oxide, aluminum oxide, strontium oxide, barium oxide and polyethylene glycol 400 weighed in step (1), adding them to soybean oil, then adding antioxidants, and kneading in a kneader to obtain a liquid anti-counterfeiting composition for anti-counterfeiting chemical fibers.

Embodiment 5: Preparation of an Anti-Counterfeiting Chemical Fiber

This embodiment provides an anti-counterfeiting chemical fiber, and in parts by mass, its raw materials comprise 99.5 parts of polyethylene glycol terephthalate and 0.5 part of the anti-counterfeiting composition prepared in Embodiment 1.

The preparation method was: weighing the polyethylene glycol terephthalate and the anti-counterfeiting composition prepared in Embodiment 1 according to formula ratio, mixing, melt extruding and spinning, pre-drawing spinning, and draw-texturing to obtain an anti-counterfeiting chemical fiber.

Embodiment 6: Preparation of an Anti-Counterfeiting Chemical Fiber

This embodiment provides an anti-counterfeiting chemical fiber, and in parts by mass, its raw materials comprise 99.6 parts of polyethylene glycol terephthalate and 0.4 part of the anti-counterfeiting composition prepared in Embodiment 2.

The preparation method was: weighing the polyethylene glycol terephthalate and the anti-counterfeiting composition prepared in Embodiment 2 according to formula ratio, mixing, melt extruding and spinning in one step to obtain an anti-counterfeiting chemical fiber.

Embodiment 7: Preparation of an Anti-Counterfeiting Chemical Fiber

This embodiment provides an anti-counterfeiting chemical fiber, and in parts by mass, its raw materials comprise 99.6 parts of polyethylene glycol terephthalate and 0.4 part of the anti-counterfeiting composition prepared in Embodiment 3.

The preparation method was: weighing the polyethylene glycol terephthalate and the anti-counterfeiting composition prepared in Embodiment 3 according to formula ratio, continuously injecting the formula amount of mother liquids of the elements into a melt of polyethylene terephthalate during the mixing stage, melt extruding and spinning to obtain an anti-counterfeiting chemical fiber.

Embodiment 8: Preparation of an Anti-Counterfeiting Chemical Fiber

This embodiment provides an anti-counterfeiting chemical fiber, and in parts by mass, its raw materials comprise 99.7 parts of polyethylene glycol terephthalate and 0.3 part of the anti-counterfeiting composition prepared in Embodiment 4.

The preparation method was: weighing the polyethylene glycol terephthalate and the anti-counterfeiting composition prepared in Embodiment 4 according to formula ratio, continuously injecting the formula amount of mother liquids of the elements into a melt of polyethylene terephthalate during the mixing stage, melt extruding and spinning to obtain an anti-counterfeiting chemical fiber.

Comparison 1

It was basically the same as Embodiment 5, only differed in that the anti-counterfeiting composition was not added to the raw materials.

Comparison 2

It was basically the same as Embodiment 7, only differed in that the anti-counterfeiting composition was not added to the raw materials.

The various acids used in the following were of analytical grade.

Embodiment 9: Detection of Anti-Counterfeiting Chemical Fiber

The anti-counterfeiting chemical fiber prepared in Embodiment 5 was tested according to the following method, and the specific testing method was:
(1) multi-point sampling, adding 0.1 g of the obtained anti-counterfeiting chemical fiber samples to 10 mL of mixed acid solution (hydrochloric acid, hydrofluoric acid, sulfuric acid and nitric acid in a volume ratio of 3:1:1:3) to obtain a premix material;
(2) digesting the premix material obtained in step (1) in a digestion apparatus, the temperature change process of the digestion treatment was from room temperature 25° C. to 150° C., and then to 200° C. again, keeping for 30 minutes; evaporating the solution at 130±5° C. for 3 hours to remove the acid, and bringing to volume to obtain 10 mL solution;
(3) using an inductively coupled plasma spectrometer to perform elemental quantitative analysis on the solution obtained in step (2), the measured content of zinc element was 4.975 ppm (g), the content of aluminum element was 24.850 ppm (g), the content of strontium element was 29.880 ppm (g), the content of barium element was 39.720 ppm (g), the content of iron element was 0.003 ppm (g), the content of magnesium element was 0.005 ppm (g), then content of zinc element:content of aluminum element:content of strontium element:content of barium element=0.995:4.970:5.976:7.944.

Embodiment 10: Detection of Anti-Counterfeiting Chemical Fiber

The anti-counterfeiting chemical fiber prepared in Embodiment 6 was tested according to the following method, and the specific testing method was:
(1) multi-point sampling, adding 0.1 g of the obtained anti-counterfeiting chemical fiber samples to 10 mL of mixed acid solution (hydrochloric acid, hydrofluoric acid, sulfuric acid and nitric acid in a volume ratio of 4:1:1:3) to obtain a premix material;
(2) digesting the premix material obtained in step (1) in a digestion apparatus, the temperature change process of the digestion treatment was from room temperature 25° C. to 150° C., and then to 190° C. again, keeping for 35 minutes; evaporating the solution at 130±5° C. for 3 hours to remove the acid, and bringing to volume to obtain 10 mL solution;

(3) using an inductively coupled plasma spectrometer to perform elemental quantitative analysis on the fixed-capacity solution obtained in step (2), the measured content of zinc element was 7.968 ppm (g), the content of aluminum element was 19.860 ppm (g), the content of strontium element was 11.904 ppm (g), the content of barium element was 19.880 ppm (g), the content of iron element was 0.003 ppm (g), the content of magnesium element was 0.002 ppm (g), then content of zinc element:content of aluminum element:content of strontium element:content of barium element=1.992:4.965:2.976:4.970.

Embodiment 11: Detection of Anti-Counterfeiting Chemical Fiber

The anti-counterfeiting chemical fiber prepared in Embodiment 7 was tested according to the following method, and the specific testing method was:

(1) multi-point sampling, adding 0.1 g of the obtained anti-counterfeiting chemical fiber samples to 10 mL of mixed acid solution (hydrochloric acid, hydrofluoric acid, sulfuric acid and nitric acid in a volume ratio of 3:1:1:3) to obtain a premix material;

(2) digesting the premix material obtained in step (1) in a digestion apparatus, the temperature change process of the digestion treatment was from room temperature 25° C. to 150° C., and then to 180° C. again, keeping for 40 minutes; evaporating the solution at 130±5° C. for 3 hours to remove the acid, and bringing to volume to obtain 10 mL solution;

(3) using an inductively coupled plasma spectrometer to perform elemental quantitative analysis on the fixed-capacity solution obtained in step (2), the measured content of zinc element was 3.980 ppm (g), the content of aluminum element was 19.900 ppm (g), the content of strontium element was 23.832 ppm (g), the content of barium element was 31.744 ppm (g), the content of iron element was 0.002 ppm (g), the content of magnesium element was 0.001 ppm (g), then content of zinc element:content of aluminum element:content of strontium element:content of barium element=0.995:4.975:5.958:7.936.

Embodiment 12: Detection of Anti-Counterfeiting Chemical Fiber

The anti-counterfeiting chemical fiber prepared in Embodiment 8 was tested according to the following method, and the specific testing method was:

(1) multi-point sampling, adding 0.1 g of the obtained anti-counterfeiting chemical fiber samples to 10 mL of mixed acid solution (hydrochloric acid, hydrofluoric acid, sulfuric acid and nitric acid in a volume ratio of 5:1:1:6) to obtain a premix material;

(2) digesting the premix material obtained in step (1) in a digestion apparatus, the temperature change process of the digestion treatment was from room temperature 25° C. to 150° C., and then to 200° C. again, keeping for 30 minutes; evaporating the solution at 130±5° C. for 3 hours to remove the acid, and bringing to volume to obtain 10 mL solution;

(3) using an inductively coupled plasma spectrometer to perform elemental quantitative analysis on the solution obtained in step (2), the measured content of zinc element was 8.937 ppm (g), the content of aluminum element was 17.874 ppm (g), the content of strontium element was 17.910 ppm (g), the content of barium element was 44.730 ppm (g), the content of iron element was 0.001 ppm (g), the content of magnesium element was 0.001 ppm (g), then content of zinc element:content of aluminum element:content of strontium element:content of barium element=2.979:5.958:5.970:14.910.

Embodiment 13: Detection of Chemical Fiber

The chemical fiber prepared in Comparison 1 was tested according to the following method, and the specific testing method was:

(1) multi-point sampling, adding 0.1 g of the obtained chemical fiber sample to 10 mL of mixed acid solution (hydrochloric acid, hydrofluoric acid, sulfuric acid and nitric acid in a volume ratio of 3:1:1:3) to obtain a premix material;

(2) digesting the premix material obtained in step (1) in a digestion apparatus, the temperature change process of the digestion treatment was from room temperature 25° C. to 150° C., and then to 200° C. again, keeping for 30 minutes; evaporating the solution at 130±5° C. for 3 hours to remove the acid, and bringing to volume to obtain 10 mL solution;

(3) using an inductively coupled plasma spectrometer to perform elemental quantitative analysis on the solution obtained in step (2), the content of iron element was 0.003 ppm (g), and the content of magnesium element was 0.005 ppm (g).

Embodiment 14: Detection of Chemical Fiber

The chemical fiber prepared in Comparison 2 was tested according to the following method, and the specific testing method was:

(1) multi-point sampling, adding 0.1 g of the obtained chemical fiber samples to 10 mL of mixed acid solution (hydrochloric acid, hydrofluoric acid, sulfuric acid and nitric acid in a volume ratio of 3:1:1:3) to obtain a premix material;

(2) digesting the premix material obtained in step (1) in a digestion apparatus, the temperature change process of the digestion treatment was from room temperature 25° C. to 150° C., and then to 200° C. again, keeping for 30 minutes; evaporating the solution at 130±5° C. for 3 hours to remove the acid, and bringing to volume to obtain 10 mL solution;

(3) using an inductively coupled plasma spectrometer to perform elemental quantitative analysis on the solution obtained in step (2), the content of iron element was 0.002 ppm (g), and the content of magnesium element was 0.001 ppm (g).

It can be seen from the above embodiments that the metal oxides in the specific combinations added in the present disclosure are made into mother liquids or masterbatches and added to the preparation of chemical fibers, and it can be seen from the test results that the detected content ratios of respective specific metal oxides are almost the same as the ratios of the feeding amounts, the detected content differences are due to experimental error or part lost in the preparation process, but the loss is very small and does not affect the determination and identification of chemical fibers, and the above-mentioned composition can give chemical fibers a sequence combination that is more difficult to be cracked, and increase the anti-counterfeiting capability, at the same time, the specific metal elements do not damage the performance of the fiber itself, and increases the anti-counterfeiting concealment, so that mother liquids or masterbatches of the elements of the present disclosure can give the chemical fiber advantages of memory tracking properties and identification functions, high anti-counterfeiting capability, and good anti-counterfeiting concealment; however, referring to the test results of the comparisons, it is further proved that the sequence combinations of the present disclosure will not be interfered by the conventional textile technology in the conventional art, and the anti-counterfeiting is reliable.

The embodiments described above are only for illustrating the technical concepts and features of the present disclosure, and are intended to make those skilled in the art being able to understand the present disclosure and thereby implement it, and should not be concluded to limit the protective scope of this disclosure.

For the sake of clarity, it is to be understood that the use of 'a' or 'an' throughout this application does not exclude a plurality, and 'comprising' does not exclude other steps or elements.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

We claim:

1. An anti-counterfeiting fiber comprising an anti-counterfeiting composition dispersed in a fiber-forming polymer, wherein the anti-counterfeiting composition comprises:
    a bio-derived oil;
    an anti-counterfeiting tracer; and
    a dispersant;
    wherein the anti-counterfeiting tracer is composed of barium oxide, strontium oxide, aluminum oxide and zinc oxide dispersed in the bio-derived oil, and the barium oxide, the strontium oxide, the aluminum oxide, and the zinc oxide in the anti-counterfeiting composition is controlled to a fixed feeding mass ratio which determines an encrypted sequence, a measured mass ratio of the barium oxide, the strontium oxide, the aluminum oxide, and the zinc oxide obtained after the anti-counterfeiting fiber is dissolved is the same as the fixed feeding mass ratio or has a small difference value relative to the fixed feeding mass ratio due to experimental error or loss in preparation process;
    wherein, in percent by mass, a sum of the barium element, the strontium element, the aluminum element, and the zinc element accounts for 5-50% of the anti-counterfeiting composition.

2. The anti-counterfeiting fiber according to claim 1, wherein
    the dispersant is polyacrylamide or polyethylene glycol with a molecular weight of 400-2000 or a mixture of both.

3. The anti-counterfeiting fiber according to claim 1, wherein a flash point of the bio-derived oil is 230-320° C.; and/or, a density of the bio-derived oil is 0.91-0.95 g/mL.

4. The anti-counterfeiting fiber according to claim 1, wherein the bio-derived oil is selected from linseed oil, olive oil, grape seed oil, corn oil, castor oil, sesame oil, soybean oil, sunflower seed oil, and combinations thereof.

5. The anti-counterfeiting fiber according to claim 1, wherein an average particle size of barium oxide, an average particle size of strontium oxide, an average particle size of aluminum oxide, and an average particle size of zinc oxide are respectively 200-750 nm; or,
    in percent by mass, the sum of the barium element, the strontium element, the aluminum element, and the zinc element accounts for 10-40% of the anti-counterfeiting composition.

6. The anti-counterfeiting fiber according to claim 1, wherein in percent by mass, the bio-derived oil accounts for 30-70% of the anti-counterfeiting composition; or,
    in percent by mass, the dispersant accounts for 1-8% of the anti-counterfeiting composition.

7. The anti-counterfeiting fiber according to claim 1, wherein the fiber-forming polymer is selected from polyethylene glycol terephthalate, polylactic acid, polycaprolactone, regenerated PET, polybutylene succinate, poly (3-hydroxybutyrate-co-3-hydroxyvalerate), poly (butylene adipate-co-terephthalate), polyethylene, polypropylene, polystyrene, polyamide, polyvinyl chloride, polyurethane, and combinations thereof.

* * * * *